US012175223B2

(12) United States Patent
Chen et al.

(10) Patent No.: US 12,175,223 B2
(45) Date of Patent: Dec. 24, 2024

(54) BUILDING A UNIFIED MACHINE LEARNING (ML)/ ARTIFICIAL INTELLIGENCE (AI) ACCELERATION FRAMEWORK ACROSS HETEROGENEOUS AI ACCELERATORS

(71) Applicant: VMware, Inc., Palo Alto, CA (US)

(72) Inventors: Tiejun Chen, Beijing (CN); Gavin Lu, Beijing (CN); Yongtao Huang, Beijing (CN); Zitong Xu, Shanghai (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/651,641

(22) Filed: Feb. 18, 2022

(65) Prior Publication Data

US 2023/0221932 A1    Jul. 13, 2023

(30) Foreign Application Priority Data

Jan. 12, 2022    (WO) ................ PCT/CN2022/071542

(51) Int. Cl.
*G06F 8/41*    (2018.01)
(52) U.S. Cl.
CPC .......... *G06F 8/44* (2013.01); *G06F 2209/509* (2013.01)
(58) Field of Classification Search
CPC ..................... G06F 8/40–52; G06F 2209/509
USPC ........................................................ 717/140
See application file for complete search history.

(56) References Cited

U.S. PATENT DOCUMENTS

| | | | |
|---|---|---|---|
| 2004/0194111 A1* | 9/2004 | Marcey ................. | G06F 9/5044 719/330 |
| 2007/0174828 A1* | 7/2007 | O'Brien ................. | G06F 8/45 717/151 |
| 2017/0353397 A1* | 12/2017 | Che ....................... | G06F 9/5088 |
| 2021/0365804 A1* | 11/2021 | Nimmagadda ......... | G06N 3/105 |
| 2022/0092439 A1* | 3/2022 | Liu ........................ | G06N 5/04 |
| 2022/0207358 A1* | 6/2022 | Nimmagadda ......... | G06N 3/063 |

FOREIGN PATENT DOCUMENTS

WO    WO-2022097245 A1 *    5/2022

OTHER PUBLICATIONS

Chen, Tai-Liang, et al., NNBlocks: a Blockly framework for AI computing, The Journal of Supercomputing, vol. 77, 31 pages, 2021, [retrieved on Mar. 18, 2023], Retrieved from the Internet: <URL:https://link.springer.com/article/10.1007/s11227-021-03631-9>.*

* cited by examiner

*Primary Examiner* — Geoffrey R St Leger
(74) *Attorney, Agent, or Firm* — King Intellectual Asset Management

(57) ABSTRACT

Disclosed is a system for converting a high-level runtime model to a low-level runtime model where the high-level runtime model runs on a client computer system, and the low-level runtime model runs on a server computer system. The server system has installed thereon a pool of hardware accelerators, and the low-level runtime model is targeted to the pool of accelerators. Outputs of the low-level runtime model are returned to the high-level runtime model as if the high-level runtime model computed the outputs.

20 Claims, 5 Drawing Sheets

BUILDING A UNIFIED MACHINE LEARNING (ML)/ ARTIFICIAL INTELLIGENCE (AI) ACCELERATION FRAMEWORK ACROSS HETEROGENEOUS AI ACCELERATORS

CROSS-REFERENCE TO RELATED APPLICATION(S)

This application claims benefit of and priority to International Application No. PCT/CN2022/071542, filed Jan. 12, 2022, which is hereby assigned to the assignee hereof and hereby expressly incorporated by reference herein in its entirety as if fully set forth below and for all applicable purposes.

BACKGROUND

Machine Learning (ML) and artificial intelligence (AI) are promising technologies, but there are many challenges in converting these technologies into practical applications. Upstream ML/AI frameworks, like TensorFlow and PyTorch, only support graphics processing units (GPUs) typically and perhaps custom field-programmable gate arrays (FPGAs). But a large variety of AI hardware (HW) accelerators has been introduced by different vendors. Users, e.g., customers and developers, typically must create models trained for these accelerators and deal with private application programming interfaces (APIs) developed for them. This makes it difficult for the users to utilize the offerings of these vendors.

In addition, ML upstream frameworks do not provide the best performance for various types of AI HW accelerators. Usually, they employ a common ML framework, which means that the upstream frameworks are not optimized for a specific accelerator.

What is needed is transparent support for accelerators other than just GPUs.

SUMMARY

To address these problems, a unified ML acceleration framework is provided. An end-to-end machine learning compiler framework is combined with an interposer block and a resolver block to make a unified acceleration framework that is transparent for users. The interposer block modifies code of the ML upstream framework so that the resolver block can collect all necessary information and then recompiles to create a model according to the underlying target. The recompiled model is then deployed on a low-level runtime to process input and input data received from the ML upstream framework. Output is exported back to the ML upstream framework as if the upstream framework computed the output. This automatic process is transparent to users.

One embodiment provides a method for converting a high-level runtime model to a low-level runtime model targeted to a pool of accelerators. The method includes establishing the pool of accelerators on the hardware of a server computer system, loading the high-level runtime on a client computer system, capturing the high-level runtime model on the server computer system, converting the high-level runtime model to the low-level runtime model, running the low-level runtime model on a low-level runtime using input and input data with which the high-level runtime model is to be run, and returning results of the low-level runtime to the high-level runtime model as outputs of the high-level runtime model.

Further embodiments include a computer-readable medium having instructions configured to carry out one or more aspects of the above method and a computer system configured to carry out one or more aspects of the above method.

DETAILED DESCRIPTION

The unified ML acceleration framework leverages an end-to-end machine learning compiler framework, such as the Tensor Virtual Machine (TVM) compiler, for compiling various deep learning models from different frameworks to central processing units (CPUs), graphics processing units (GPUs), and many other specialized accelerators. The TVM compiler supports model compilation from a wide range of front ends such as TensorFlow, Onnx, Keras, Mxnet, Darknet, CoreML, and Caffe2. Though certain aspects are described with respect to TVM, other similar frameworks may be used.

To make a unified acceleration framework transparent for users, an interposer block and a resolver block are included. The interposer block modifies code of the ML upstream framework so that the resolver block can collect all necessary information, including model data, parameters including input {name, shape}, output {name, shape} and input data (image, video, raw data, etc). The model is then recompiled to a model according to the underlying target (CPU, GPU, other AI accelerators).

The recompiled model is then deployed on a low-level runtime, such as a TVM runtime, to process input and input data received from the ML upstream framework. This ML upstream framework can include a Python high-level runtime. Though certain aspects are described with respect to a Python runtime, other similar runtimes may be used. The output of the low-level runtime is then exported back to the ML upstream framework to be used as if it had been generated by the upstream framework.

In an embodiment, a high-level runtime, such as the Python runtime, is installed on a client node. A compute node (e.g., a server node) has installed thereon specific hardware accelerators and a low-level runtime, such as the TVM runtime. The low-level runtime runs a model that can be targeted to the specific hardware accelerators. A compiler converts a model of the high-level runtime to the model of the low-level runtime using information about the specific hardware accelerators. The client node allows users to write models for the high-level runtime without having to optimize the model to run on specific hardware accelerators.

Figure 1:
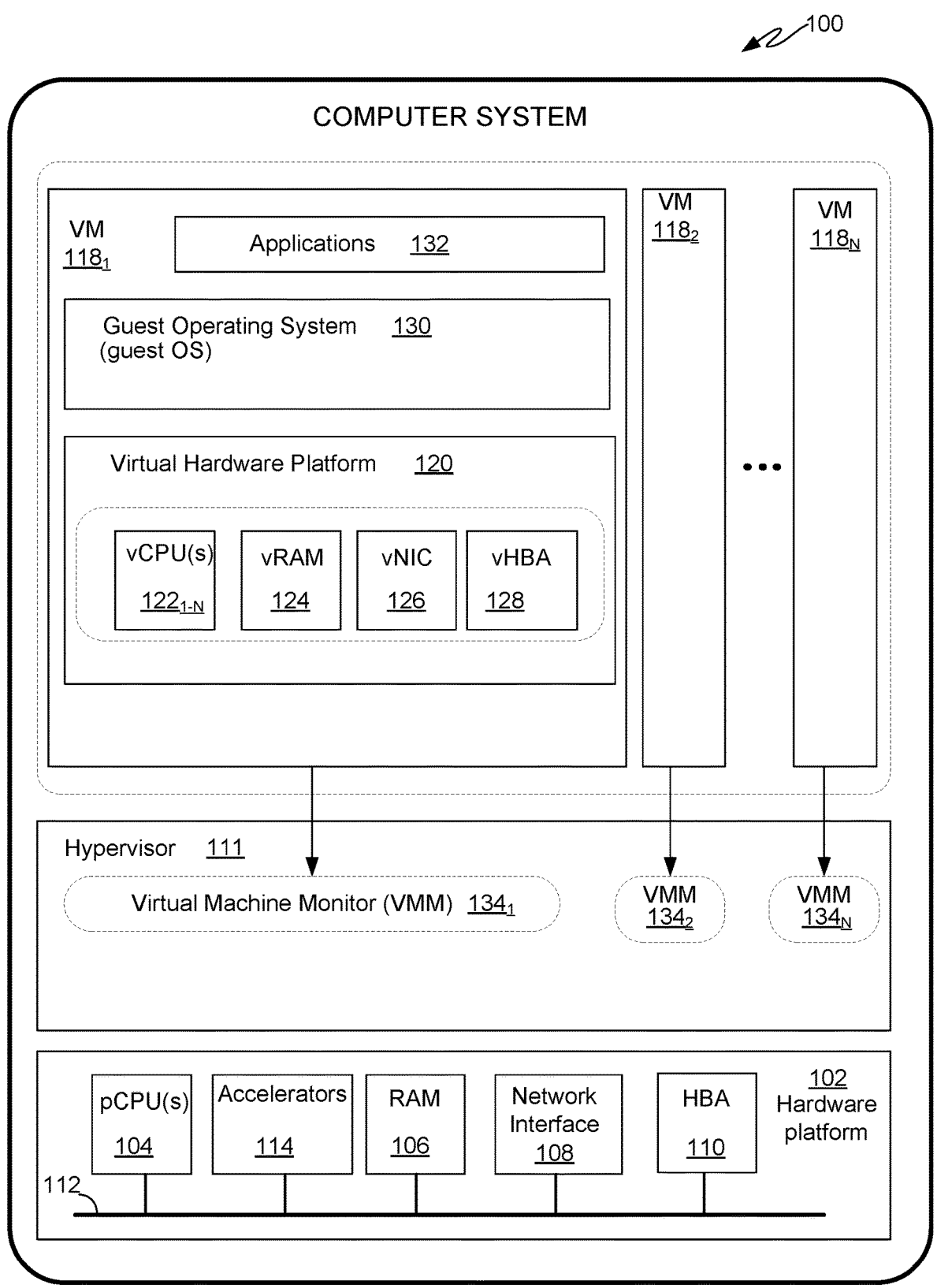
FIG. 1 depicts a block diagram of a computer system that is representative of a virtualized computer system architecture in which embodiments may be implemented.

FIG. 1 depicts a block diagram of a computer system that is representative of a virtualized computer system architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware such as physical central processing units (pCPUs) 104, hardware accelerators 114, a random access memory (RAM) 106, one or more network interfaces 108 for connecting to a network, and one or more host bus adapters (HBA) 110 for connecting to a storage system, all interconnected by a bus 112.

A virtualization software layer, referred to hereinafter as hypervisor 111 or kernel 111, is installed on top of hardware platform 102. Hypervisor 111 makes possible the instantiation and concurrent execution of one or more virtual machines (VMs) $118_1$-$118_N$. The interaction of VM 118 with hypervisor 111 is facilitated by the virtual machine monitors (VMMs, also referred to as monitors) 134. Each VMM $134_1$-$134_N$ is assigned to and monitors a corresponding VM $118_1$-$118_N$. In one embodiment, hypervisor 111 may be implemented as a commercial product in VMware's vSphere® virtualization product, available from VMware Inc. of Palo Alto, CA.

In an alternative embodiment, hypervisor 111 runs on top of a host operating system which itself runs on hardware platform 102. In such an embodiment, hypervisor 111 operates above an abstraction level provided by the host operating system. After instantiation, each VM $118_1$-$118_N$ encapsulates a virtual hardware platform 120 that is executed under the control of hypervisor 111, in particular the corresponding VMM $134_1$-$134_N$. For example, virtual hardware devices of VM $118_1$ in virtual hardware platform 120 include one or more virtual CPUs (vCPUs) $122_1$-$122_N$, a virtual random access memory (vRAM) 124, a virtual network interface adapter (vNIC) 126, and virtual host bus adapter (vHBA) 128. Virtual hardware platform 120 supports the installation of a guest operating system (guest OS) 130, on top of which applications 132 are executed in VM $118_1$. Examples of guest OS 130 include any of the well-known commodity operating systems, such as the Microsoft Windows® operating system, the Linux® operating system, and the like.

It should be recognized that the various terms, layers, and categorizations used to describe the components in FIG. 1 may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since each VMM includes the hardware emulation components for the virtual machine.

Figure 2:
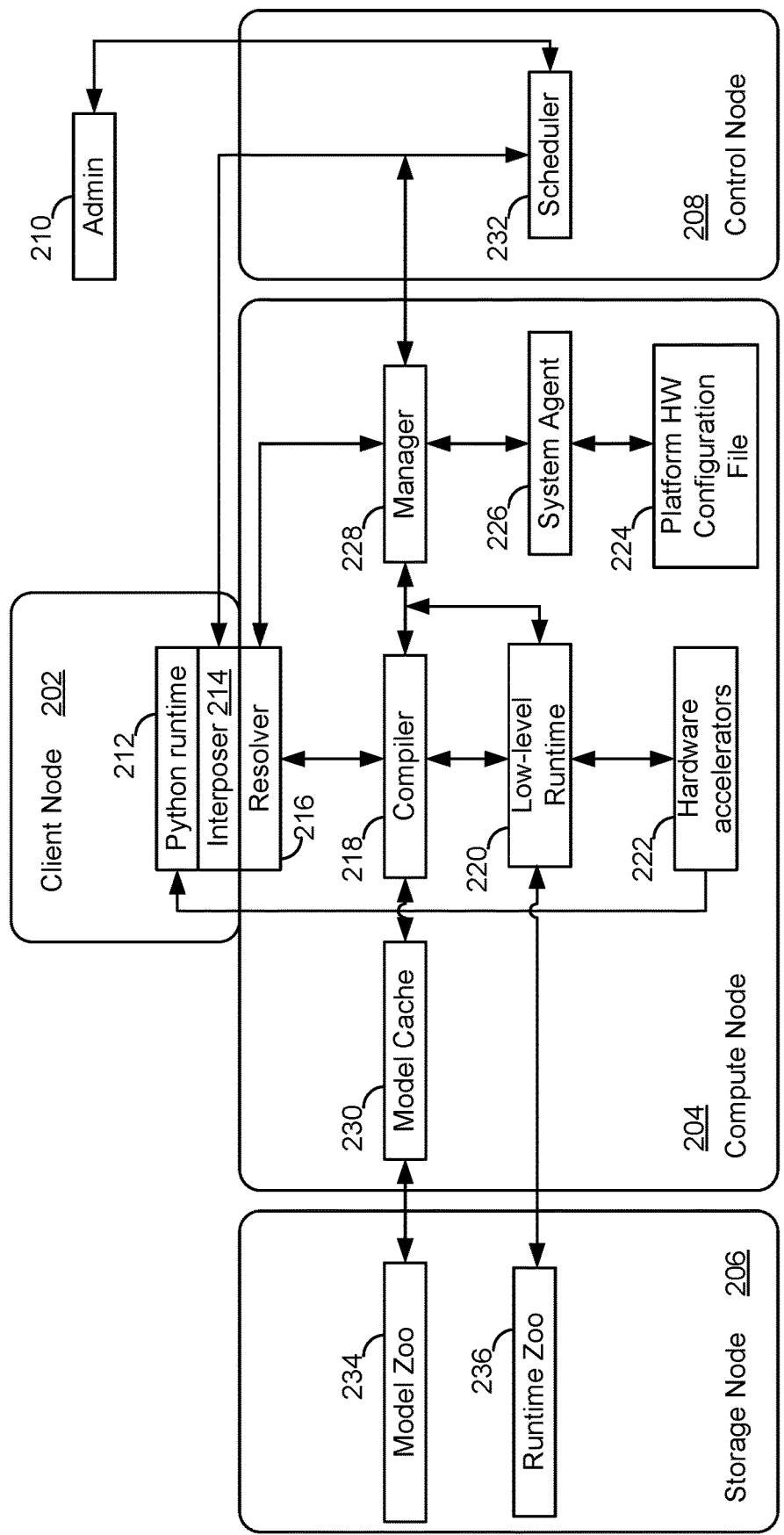
FIG. 2 depicts a block diagram of system components according to embodiments.

FIG. 2 depicts a block diagram of components according to embodiments. The components are included in a client node (also referred to as a client computer system) 202, a compute node (also referred to as a server computer system) 204, a storage node 206, and a control node 208. In an embodiment, each node is an instance of the computer system 100 of FIG. 1.

The client node 202 includes the Python runtime 212 or other runtime and an interposer block 214. The Python runtime 212 runs the ML or AI application. Interposer block 214 includes code that catches the activity (runtime APIs, system calls, and library calls) of the Python runtime 212. In one embodiment, the interposer block 214 dynamically modifies the load_model and the customer_predict APIs of TensorFlow.

Compute node 204 includes a resolver block 216, a manager 228, a system agent 226, a compile block 218, a model cache 230, a low-level runtime block 220, hardware accelerators 222, and a platform hardware configuration file 224.

Resolver block 216, in response to the interposer block, retrieves information needed to compile the model, including the model type, the model input name, the model input shape, the model output shape, and name. The block converts this model using the hardware configuration file to the TVM Relay format and saves the model. The block also calls the TVM runtime API to run a pre-compiled TVM relay file on the low-level runtime block 220 with the input provided to Python runtime 212. In one embodiment, the resolver block 216 runs the dynamically modified TensorFlow APIs, load_model and customer_predict, to perform the above actions.

Manager 228 connects to the scheduler 232, resolver block 216, the compile block, low-level runtime, and responds to the system agent to set up the activities of the other blocks.

System agent 226 receives a platform hardware configuration file 224 and notifies manager 228 to set up compile block 218 for the specific hardware configuration.

Figure 4:
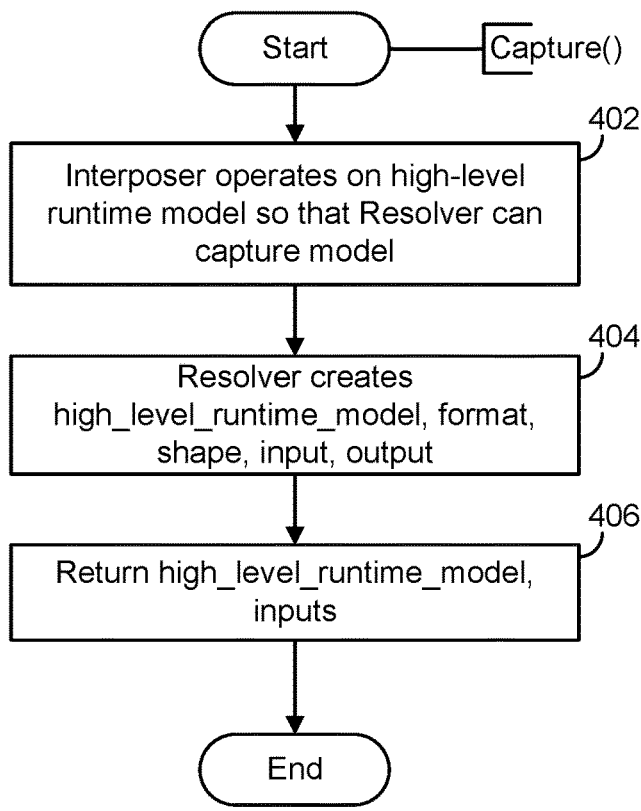
FIG. 4 depicts a flow of operations of the Capture function, according to embodiments.

Compile block 218 is described in reference to FIG. 4. Model output from the compile block 218 is sent to low-level runtime block 220.

Model cache 230 stores previously compiled models, such as those in TVM relay format, from compile block 218.

Low-level runtime block 220 is a language virtual machine, such as TVM runtime, which is assisted by the hardware accelerators 222 installed on the compute node 204. The results of low-level runtime block 220 for a given high-level input and input data are fed back to Python runtime 212, making it appear as if Python runtime 212 produced the results.

The hardware accelerators 222 are GPUs, FPGAs, or other specialized hardware for accelerating certain types of workload computations.

The storage node 206 includes a runtime zoo 236 and a model zoo 234. Runtime zoo 236 stores base images, including the low-level runtime and dependencies. For example, if the low-level runtime block needs third-party utilities such as TensorRT, TensorRT is stored. Model zoo 234 may store items with the TVM Relay format, which is a high-level intermediate representation generated by the Compile block 218.

Control node 208 provides an interface to administrator/user 210 and registers compute node 204 and storage node 206 with client node 202. Control node 208 includes a scheduler 232 that schedules tasks on AI accelerators 222 installed on compute node 204.

Figure 3:
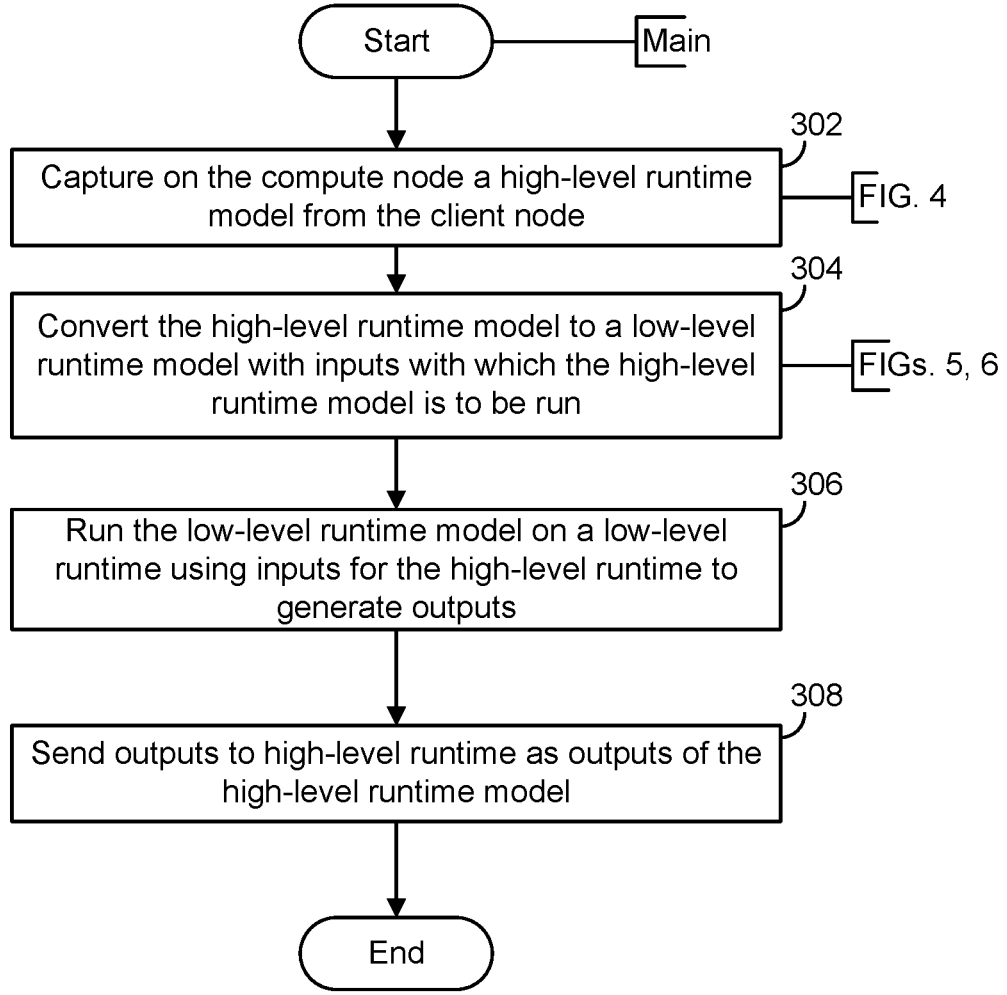
FIG. 3 depicts a flow of operations for the main workflow, according to embodiments.

FIG. 3 depicts a flow of operations for the main workflow, according to embodiments. In step 302, compute node 204 captures a high-level runtime model from client node 202. The Capture function is further described in reference to FIG. 4. In step 304, compute node 204 converts the high-level runtime model to a low-level runtime model designed to run with the input and input data for the high-level runtime model. The Convert function is further described in reference to FIGS. 5 and 6. In step 306, the low-level model is run by a low-level runtime block 220, such as TVM runtime, using the input and input data with which the high-level runtime model is to be run to generate outputs. In step 308, the outputs are sent to the high-level runtime model, such as Python runtime 212 as the outputs of the high-level runtime, as if the high-level runtime model generated the outputs.

FIG. 4 depicts a flow of operations for the Capture function, according to embodiments. In step 402, interposer block 214 on client node 202 operates on the high-level runtime model to dynamically modify code, so that resolver block 216 on compute node 204 can capture the model. In step 404, resolver block 216 on compute node 204 captures the format, shape, input, and output for the high-level runtime model. In an embodiment, the high-level runtime model is a high-level computational graph. The high-level computational graph includes nodes that represent an operation that consumes one or more tensors and produces one or more tensors. In the high-level computational graph, the operations are specified, but their low-level implementation is not. In step 406, the high-level runtime model with input and input data is returned.

Figure 5:
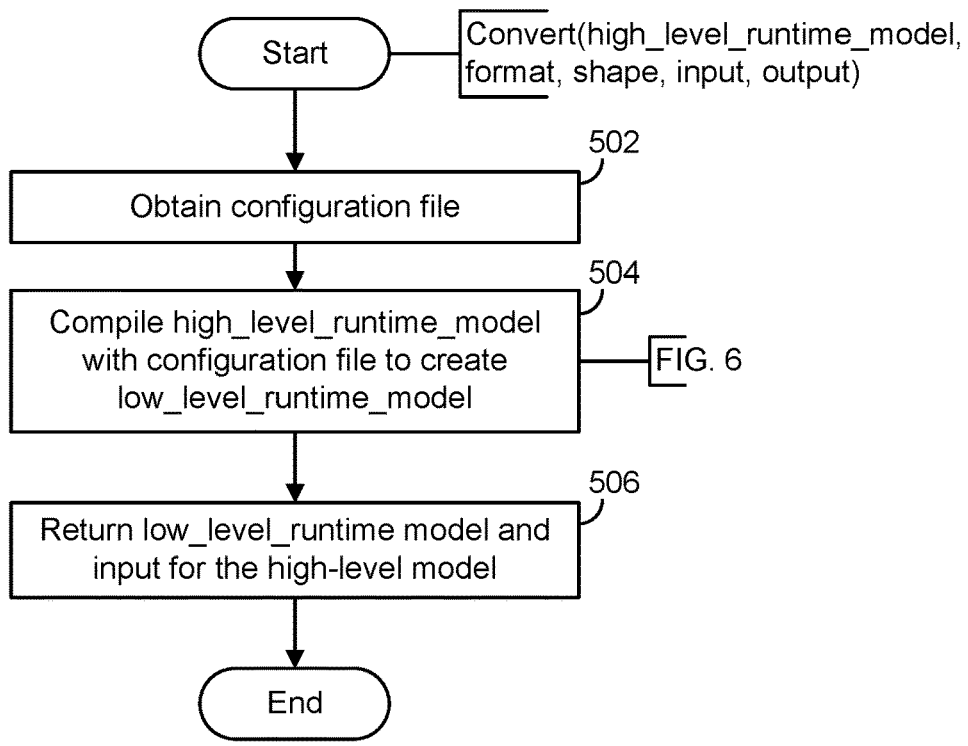
FIG. 5 depicts a flow of operations of the Convert function, according to embodiments.

FIG. 5 depicts a flow of operations for the Convert function, according to embodiments. In step 502, compute node 204 obtains the platform hardware configuration file 224 based on hardware accelerators 222 installed on compute node 204. In step 504, compute node 204 compiles using compiler block 218 the high-level runtime model using the platform hardware configuration file 224 to create the low-level runtime model. In step 506, compute node 204 returns the low-level runtime model along with the input and input data with which the high-level model is to be run.

Figure 6:
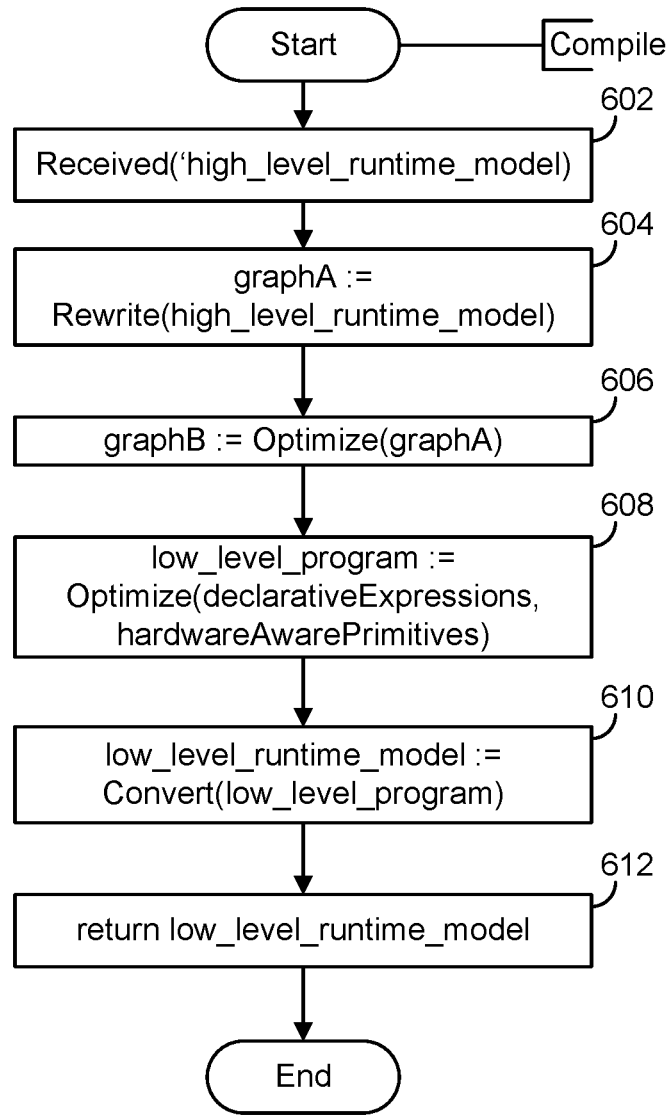
FIG. 6 depicts a flow of operations of the Compile function.

FIG. 6 depicts a flow of operations for the Compile function step in FIG. 504 of FIG. 5. In step 602, compute node 204 obtains the high-level runtime model, such as a graph from TensorFlow or PyTorch. In step 604, compute node 204 rewrites the high-level runtime model to become graphA, which is an equivalent representation but one more suited to optimizations. In step 606, compute node 204 then optimizes the rewritten graph (graphA) to become graphB. The optimizations include operator fusion, constant folding, memory planning, and data layout transformations. Operator fusion fuses multiple small graph-operations together according to a prescribed set of rules. Constant folding pre-computes graph parts that can be determined statically, thereby saving execution costs. Memory planning pre-allocates memory to hold intermediate tensors. A data layout transformation transforms internal data layouts into targeted hardware-friendly forms. In step 608, compute node 204 creates a low-level program by optimizing graphB using declarative expressions and hardware-aware primitives, i.e., primitives tailored to the specific hardware accelerators installed on the compute node. For example, if the accelerators are graphic processing units (GPUs), the primitives include items from CUDA or OpenCL. In step 610, compute node 204 converts the low-level program into the low-level runtime model, which is suited to hardware accelerators 222 and is to be run on a low-level runtime block 220 such as TVM runtime. In step 612, the low-level runtime model is returned.

Thus, by including an interposer block on a client computer system and resolver block on a server computer system, models of a high-level framework, such as Tensor-Flow and PyTorch, on a client computer system may be executed on a compute node having specialized hardware without the high-level framework having any information about the specialized hardware. The outputs appear from the low-level runtime model as if the high-level model generated them.

Certain embodiments as described above involve a hardware abstraction layer on top of a host computer. The hardware abstraction layer allows multiple contexts to share the hardware resource. These contexts are isolated from each other in one embodiment, each having at least a user application program running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application program runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application program and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application program's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims.

Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for converting a high-level runtime model to a low-level runtime model targeted to a pool of accelerators on hardware of a server computer system, the method comprising:
   dynamically modifying the high-level runtime model;
   capturing one or more features of the high-level runtime model, the one or more features comprising a shape of the high-level runtime model;
   subsequent to the capturing, converting the high-level runtime model to the low-level runtime model;
   running the low-level runtime model on a low-level runtime using input with which the high-level runtime model is to be run; and
   returning results of running the low-level runtime model to a high-level runtime, wherein the high-level runtime outputs the results as if they were generated by the high-level runtime model.

2. The method of claim 1, wherein one or more accelerators in the pool of accelerators is a graphical processing unit (GPU).

3. The method of claim 1, wherein the low-level runtime is a Tensor Virtual Machine (TVM) runtime.

4. The method of claim 1, wherein the high-level runtime model is a Python runtime model.

5. The method of claim 1, wherein the high-level runtime model generates a computational graph and converting includes rewriting the computational graph.

6. The method of claim 5, wherein converting further includes compiling the computational graph to the low-level runtime model based on information about the pool of accelerators.

7. The method of claim 6, wherein the information about the pool of accelerators is provided by a configuration file on the server computer system.

8. The method of claim 1, wherein the one or more features further comprise an input for the high-level runtime model and an output for the high-level runtime model.

9. The method of claim 1, wherein the one or more features further comprise a format of the high-level runtime model.

10. The method of claim 1, wherein modifying the high-level runtime model comprises dynamically modifying one or more application programming interfaces (API) of the high-level runtime model.

11. A system for accessing a pool of accelerators, the system comprising:
    one or more processors; and
    a non-transitory computer-readable medium comprising instructions, which, when executed, cause the one or more processors to:
    dynamically modify a high-level runtime model;
    capture one or more features of the high-level runtime model, the one or more features comprising a shape of the high-level runtime model;
    subsequent to the capturing, convert the high-level runtime model to a low-level runtime model;
    run the low-level runtime model on a low-level runtime using high-level inputs with which the high-level runtime model is to be run; and
    return results of running the low-level runtime model to a high-level runtime, wherein the high-level runtime outputs the results as if they were generated by the high-level runtime model.

12. The system of claim 11, wherein one or more accelerators in the pool of accelerators is a graphical processing unit (GPU).

13. The system of claim 11, wherein the low-level runtime is a Tensor Virtual Machine (TVM) runtime.

14. The system of claim 11, wherein the high-level runtime model is a Python runtime model.

15. The system of claim 11, wherein the high-level runtime model generates a computational graph and converting includes rewriting the computational graph.

16. The system of claim 15, wherein converting further includes compiling the computational graph to the low-level runtime model based on information about the pool of accelerators.

17. The system of claim 16, wherein the information about the pool of accelerators is provided by a configuration file on a server computer system.

18. A non-transitory computer-readable medium comprising instructions, which, when executed, cause a computer system to carry out a method for converting a high-level runtime model to a low-level runtime model targeted to a pool of accelerators on hardware of a server computer system, the method comprising:
    dynamically modifying the high-level runtime model;
    capturing one or more features of the high-level runtime model, the one or more features comprising a shape of the high-level runtime model;
    subsequent to the capturing, converting the high-level runtime model to the low-level runtime model;
    running the low-level runtime model on a low-level runtime using high-level inputs with which the high-level runtime model is to be run; and
    returning results of running the low-level runtime model to a high-level runtime, wherein the high-level runtime outputs the results as if they were generated by the high-level runtime model.

19. The non-transitory computer-readable medium of claim 18, wherein one or more accelerators in the pool of accelerators is a graphical processing unit (GPU).

20. The non-transitory computer-readable medium of claim 18, wherein the low-level runtime is a Tensor Virtual Machine (TVM) runtime.

* * * * *